(No Model.)
S. L. BEAN.
DUST COLLECTOR FOR GRINDING MILLS.
No. 248,984. Patented Nov. 1, 1881.
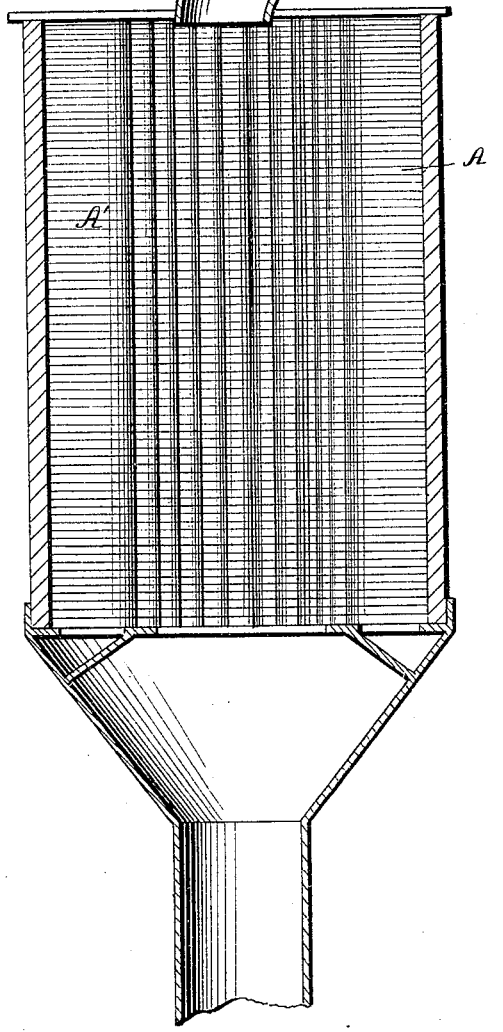
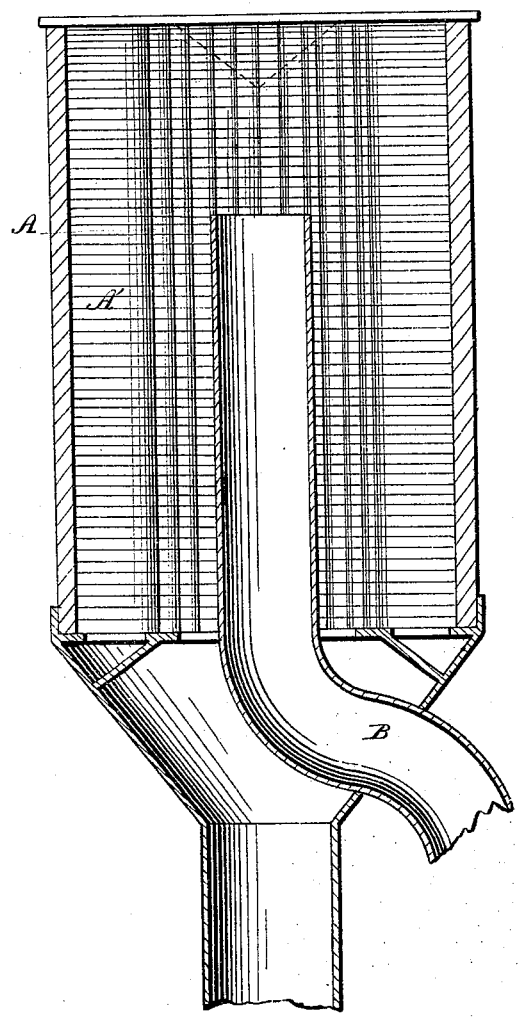
Witnesses.
Franck L. Durand
C. A. Neale
Inventor.
Samuel L. Bean
by his Attorneys
Eils & Doolittle

United States Patent Office.

SAMUEL L. BEAN, OF WASHINGTON, DISTRICT OF COLUMBIA.

DUST-COLLECTOR FOR GRINDING-MILLS.

SPECIFICATION forming part of Letters Patent No. 248,984, dated November 1, 1881.

Application filed January 6, 1881. (No model.)

*To all whom it may concern:*

Be it known that I, SAMUEL L. BEAN, a citizen of the United States, residing at Washington, in the county of Washington and District of Columbia, have invented certain new and useful Improvements in Dust-Collectors for Grinding-Mills; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to screens for separating and collecting dust from dust-laden air of milling-machines in grinding-mills generally, but particularly in flouring-mills.

The object of my improvement is to direct the air-currents into such screens or separators in such a manner that they will tend to assist rather than retard the falling or settling of the separated dust.

To this end my invention consists in introducing the air-currents centrally at the top or upper portion of such screens or separators, and so that the influx may be parallel to the separating or straining cloth.

In the annexed drawings, Figure 1 is a vertical section of my invention, showing the air-trunk connected to the top thereof. Fig. 2 is also a vertical section of my invention, showing the air-trunk passing up through the bottom and extending into the upper portion thereof. A cone-distributer is shown, also, in dotted lines.

I have illustrated my invention as applied to what I have in my former United States Patents termed a "dust-catching balloon;" but it is obvious that it may be applied to other forms of dust-collectors.

The preferred form of my invention consists in connecting the air-trunk B, for conveying the dust-laden air from the machine or machines from which it leads, to the center of the top of the balloon or collector A, so that the dust-laden air enters said dust-collector through the top in a direction parallel with the separating or straining cloth, and flows and expands naturally in a downward direction; but the object in view will be attained, though not quite so perfectly, by having the air-trunk pass up through the bottom of the collector and extending up into the upper portion thereof, as shown in Fig. 2. In this case the upward current at the influx is almost immediately turned into a downward current. In both cases the downward current assists the falling of the separated dust to the bottom of the collector, the result aimed at. By inducing a downward current in the collector some of the heavier particles of dust may settle by their gravity alone, and before reaching the reticulated cloth A' of the collector, and thus lessen the screening duty of such cloth, so that it can be more easily kept clean or open. The collector should be cleaned or shaken or knocked at intervals, as usual, to remove or shake the dust from its cloth. This may be done by any known means adapted to the particular style of collector used. It will be observed that such cleaning of the cloth will also be assisted by the downward current in the balloon. Where the dust-laden air is introduced through a tube, as in Fig. 2, it may be expedient to use a cone-distributer over it, as indicated in dotted lines.

I am aware that dust-laden air has been blown into the upper portion of a dust-collecting chamber through one side thereof. This I do not claim.

Having thus described my invention, what I claim is—

An air-straining dust-collector having at the top an induction-opening discharging centrally and in a direction parallel to the separating or straining cloth, substantially as described, whereby the air is caused to expand downwardly, and thus assist the settling of the separated dust.

In testimony whereof I affix my signature in presence of two witnesses.

SAML. L. BEAN.

Witnesses:
C. A. NEALE,
C. S. HYER.